Patented July 19, 1938

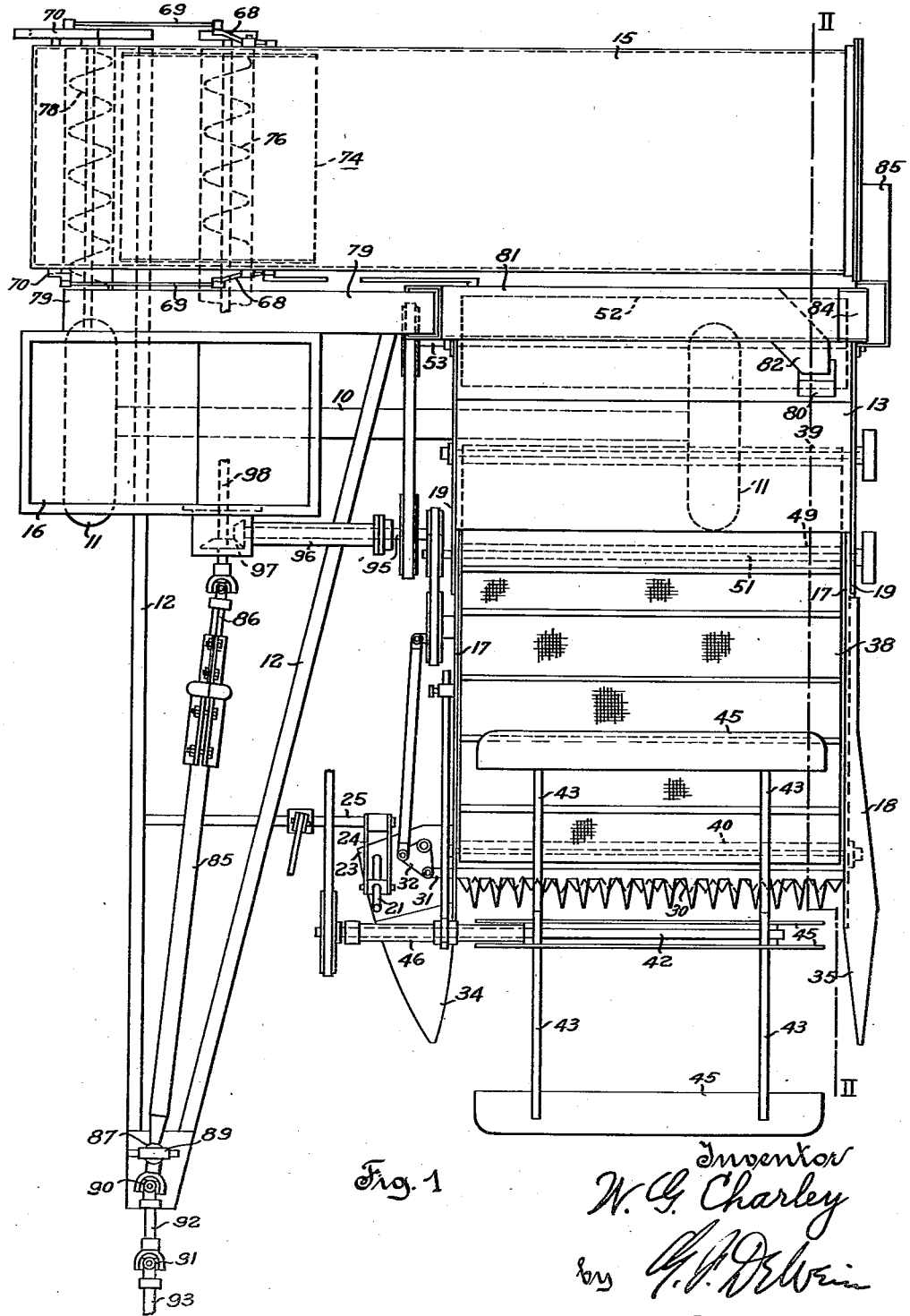

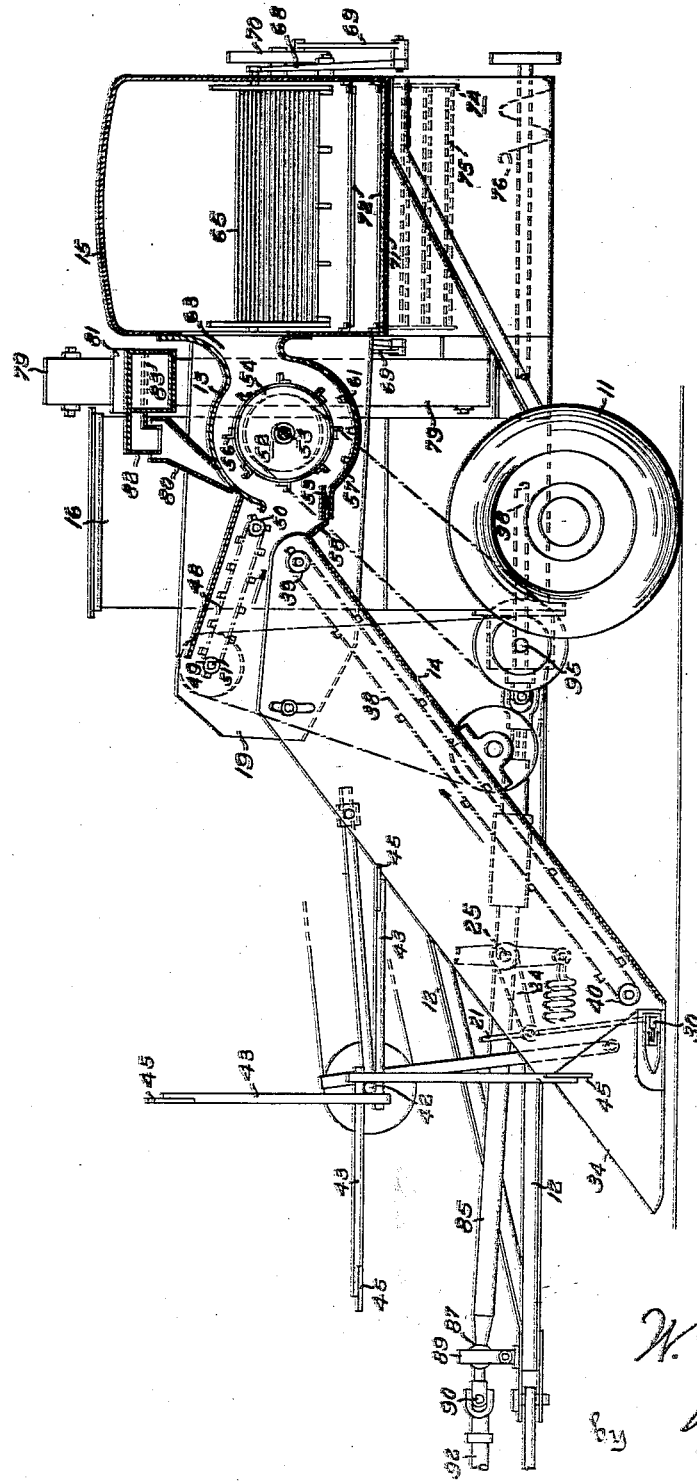

2,123,879

UNITED STATES PATENT OFFICE 2,123,879

HARVESTER-THRESHER

Walter G. Charley, Brighton, Victoria, Australia, assignor to Allis-Chalmers Manufacturing Company, Milwaukee, Wis., a corporation of Delaware Application August 10, 1935, Serial No. 35,584
Renewed December 17, 1936

26 Claims. (Cl. 56—21)

This invention relates in general to improvements in threshing machines of the class generally known as harvester-threshers or combines wherein the mechanism for harvesting grain or like crops is combined in a single apparatus with the mechanism for threshing and separating the threshed grain or the like from the straw or stalks.

It is a general object of the present invention to provide an improved harvester-thresher or combine of simple and compact design and capable of efficiently handling a wide variety of crops under various growth and other conditions and which is of relatively small weight and size and low power requirements, thus permitting the apparatus to be manufactured at relatively low cost and to be efficiently operated at relatively high speed and capacity with minimum power requirements.

It is a further object of this invention to provide a harvester-thresher of simple and improved design and construction wherein the grain severed by a cutting sickle may be conveyed directly to a threshing cylinder of a length substantially the same as the effective length of the sickle and wherein the material discharged from the threshing cylinder passes to a separating mechanism wherein the material is advanced, during the separating action on the material, in a direction parallel to the axis of the threshing cylinder and transversely of the direction of the travel of the machine and may be discharged from the separating mechanism at a point laterally outside of the apparatus.

It is a further object of this invention to provide an improved harvester-thresher of the aforesaid character wherein the apparatus may be mounted on and the weight thereof substantially balanced about a single pair of traction wheels.

These and other objects and advantages are attained by the present invention, various novel features of which will be apparent from the description and the accompanying drawings, disclosing an embodiment of the invention, and will be more particularly pointed out in the claims.

In the accompanying drawings:

Fig. 1 is a plan view of a harvester-thresher or combine embodying features of the present invention;

Fig. 2 is a sectional view in the plane of the line II—II of Fig. 1.

Referring to the drawings, a main support for the apparatus may be in the form of a steel tube 10 carrying journals for the supporting and traction wheels 11 and extending transversely of the normal direction of travel of the apparatus. On this tubular support 10 is mounted an auxiliary supporting structure of a fabricated character and including a forwardly projecting fabricated frame 12 serving as a drawbar support through which tractive effort of a source of traction, such as a power tractor, may be applied through a suitable coupling at the forward end of the frame 12, and as a support for a power shaft through which power is supplied from a tractor for operating the several mechanisms of the apparatus, and a framework on which are carried several major elements of the apparatus, such as the supporting and enclosing housing 13 for the threshing mechanism, with the auxiliary header frame 14 carried by the latter housing, and the separator housing 15 communicating with the discharge side of the thresher housing 13 and extending transversely thereof, and a storage bin 16 for clean grain. The position of the traction wheels and their journals and the design of the parts of the machine are such that the weight of the harvester-thresher is balanced about the axis of rotation of these wheels.

The header frame 14 is of trough like form open at its forward and rear ends and has side walls 17 which may be flanged at their upper edges throughout a portion of their length, particularly the flange 18 on the outer side wall being of tapering curvature and acting as a splitter and guide to deposit cut grain on the header frame. The side walls 17 of the header frame fit closely within side walls 19 of the housing 13 for the threshing mechanism at the open forward side thereof, and the header frame is mounted on the housing 13 through a pivotal connection between the side walls of the header frame and the side walls of the housing 13, so that the lower forward edge of the header frame which carries the cutting sickle may be swung upward and downward to a desired position of adjustment relative to the ground.

The header frame may be actuated to desired position of adjustment relative to the ground by means of a rod 21, preferably pivotally attached at its lower end to a laterally extending flange or plate 23 on the inner side wall of the header frame, and this rod may be attached at its upper end to an arm 24 carried by a rod 25 pivotally mounted on the drawbar frame 12. Suitable actuating mechanism, preferably including a balancing spring or other device to balance the weight of the header frame about its pivotal point, may be associated with the operating rod 25 to facilitate ready and easy actuation of the header frame up and down to desired operating position of the forward edge of the header frame.

At the forward end of the header frame 14 adjacent the bottom plate thereof is mounted a sickle device 30 of conventional design, as in the form of relatively movable cooperative serrated cutting knives, and an actuating rod 31 for said sickle device is pivotally attached to an actuating plate 32 pivotally mounted on the laterally extending plate 23 carried by the inner side wall of the header frame.

A shield or guard 34 of generally rounded and forwardly tapering shape and open at its rear side is attached to the lower end of the inner side wall of the header frame and the plate 23, and serves to protect operating mechanism, such as the header frame actuating rod 21 and sickle actuating plate 32, and also serves to guide grain toward the sickle. The outer side wall of the header frame may be extended, by an integral or separately secured portion, in advance of the inner side wall of this frame, and preferably is shaped to provide a curved and forwardly tapering surface, as indicated at 35, the structure forming a relatively smooth surface splitter which enters the standing grain and serves to lift and gather fallen grain and move the same toward the sickle.

Mounted within the header frame adjacent the lower edges of the side walls thereof is a traveling conveyer 38 of the draper belt type, preferably provided on its outer or working surface with cross bars or strips serving to catch and hold loose grain. This belt is of a width equal to substantially the full length of the sickle device, and it travels over a driving roller 39 having shaft journals rotatably mounted in bearings on the side walls 17 of the header frame near the upper end thereof and on the adjacent portions of the side walls 19 of the housing 13, the driving shaft of this upper roller preferably being coincident with the axis on which the header frame has its pivotal movement on the side walls of the housing 13, and projecting through the outer side wall 19 of such housing.

The lower or foot roller 40 about which the draper 38 travels, has shaft extensions in bearings on the side walls of the header frame.

A rotatable gathering reel is mounted on the header frame in operative position relative to the sickle and the traveling draper. This reel includes a rotatable shaft 42 and a pair of spaced sets of reel arms, each set including four arms 43 disposed ninety degrees apart and suitably attached to the shaft 42 for rotation therewith. A paddle or bat 45 is attached to the two corresponding arms 43 of the two sets, at their outer ends and along the leading edges of the arms. The reel shaft is rotatably supported in suitable bearings or a single bearing of extended length, a bearing housing 46 being shown as of such extended length as to provide for the support and rotation of the reel shaft, this bearing support being suitably carried upon an adjacent portion of the header frame and preferably being mounted thereon so as to permit both up and down and fore and aft adjustment of the position of the bearing, to thus provide for adjusting the position of the reel with respect to the cutting sickle. In the operation of the reel, the reel arms and the paddles or bats carried at their outer extremities move in an anti-clockwise direction, considering Fig. 2 of the drawings. As the paddles are carried to their lowermost position, the uncut grain is carried or urged forward by the paddles and presented to the sickle, and thereafter the cut grain is deposited by the paddles on the conveying draper 38.

An endless feeding conveyer 48, in the form of a draper belt preferably provided with transverse bars or slats on the working surface thereof, is driven by a driving roller 49 and travels over a second roller 50 disposed above and somewhat beyond the upper roller 39 of the conveying draper 38. Shaft extensions of the rollers 49 and 50 are mounted in bearings in the side walls 19 of the housing 13, the shaft 51 of the driving roller 49 passing to the outer side of the outer side wall 19 of the housing 13. The rollers 49 and 50 are so positioned and the feeding draper 48 is so driven that the lower course of the latter draper travels, like the upper course of the conveying draper 38, toward the threshing mechanism in the housing 13, and the working surfaces of the two drapers gradually approaching each other to produce a throat or restricted area over the upper roll 39 of the draper 38. The lower surface of the draper 48, particularly at its inner end, is adapted to press against and advance material which has been fed along and by the working surfaces of the draper 38, and this feeding of material is facilitated by having the linear speed of the upper draper somewhat greater than that of the lower draper.

The threshing cylinder, indicated generally at 52, comprises an operating shaft 53 and an open-work frame structure 54 of generally cylindrical outline including a plurality of peripherally spaced thresher bars 56 in the form of sections of angle iron, radially extending flange portions of the bars serving as active threshing elements.

The stationary concave element with which the thresher bars cooperate in the threshing operation includes a generally circular housing portion 57 beneath the threshing cylinder and a throat or ledger plate assembly at the forward edge of this housing portion, this assembly comprising a bent plate portion 58 associated with the bottom wall of the header frame and having its rear edge projecting beyond the adjacent forward edge of the cylinder housing. An adjustable choking or ledger plate 59 is mounted and secured in position at the rear edge of the bent plate 58 and extends beyond the same and over the forward edge of the cylinder housing, into relatively close proximity to the path of the rotatable threshing elements. Through the adjustable mounting of this ledger plate, its rear edge may be moved toward and from the threshing cylinder, thus most efficiently accommodating for wear of the rear edge of the ledger plate and for diverse characteristics of various crops to be threshed, particularly as to the size or character of the grain kernels or seeds and the stalks.

On the upper surface of the bottom of the concave housing 57, bars or strips 61 are provided, these latter extending generally parallel to the axis of the threshing cylinder and projecting into relatively close proximity to the path of the thresher bars 56. These bars or strips may be in the form of raised portions of the housing or in the form of bars secured to the housing.

The upper portion of the housing for the threshing cylinder follows and is relatively closely spaced from the path of the threshing bars 56 to a point adjacent the end of the upper feeding draper 48.

The bearings for the shaft 53 of the threshing cylinder may be mounted, in a conventional manner, so as to be adjustable toward and from the active threshing portions of the concave. With such an arrangement, the space between the path of travel of the rotating threshing bars and the concave threshing projections may be varied to best facilitate the passage of the various kinds of threshed grain or seeds and the stalks of the crop.

The lower portion 57 of the cylinder housing may be perforated adjacent the threshing or stripper bars 61 so as to permit threshed grain to pass therethrough from the housing, whence such grain may be conducted to the grain pan of the separator, or the housing may be substantially imperforate, as indicated, in which case all of the threshed grain is forced through the housing and is discharged therefrom, along with the straw or stalks, through the discharge passage 63 into the separator housing 15, and drops on the shaking devices therein.

The discharge opening or passage 63 extends across the full width of the threshing cylinder and opens into the forward portion of the separator housing 15 through the adjacent wall thereof.

As indicated, the separator housing 15 extends from one end of threshing cylinder housing past the other end thereof and to an extended distance beyond to the other side of the machine. And the housing 15 is provided with devices for shaking the straw and recovering threshed grain therefrom, these devices including a straw shaking rack 65 extending the full length and approximately the full width of the separator housing. This shaking rack may be of known or conventional slatted type which permits the grain to fall through the rack between the slats thereof, and advances the straw along the rack to the discharge end whence it is carried or blown to the ground at a point laterally beyond the machine.

The straw rack is mounted in operative position to provide for the desired oscillating or shaking motion through a conventional form of link and shaker arm support, the desired vibrating or shaking motion being imparted to the rack through oscillation of such shaker arms, such a shaker arm being indicated at 68, and an operating eccentric and connecting rod therefor at 70 and 69 respectively.

In the operation of the threshing mechanism, the harvested grain is moved upwardly along the conveying draper 38 toward its discharge end where the feeding draper 48 cooperates in moving the grain toward the threshing mechanism and into the path of travel of the threshing bars 56, and the latter, moving at a relatively high speed, beat the grain kernels from the straw and force or draw the threshed grain and straw between the threshing bars and the rear edge of the ledger plate. During this operation, the heads of grain are forcibly projected against the rear edge of the ledger plate and then carried beyond the same by the rotating threshing bars, the latter carrying the grain and straw past the threshing bars of the concave, the cooperative movable and fixed threshing bars serving to beat grain from the heads as the latter and the straw are passed through the space between the cylinder and the concave.

Due to the fact that there is considerable fan action of the rapidly rotating threshing cylinder, particularly with the lower portion of the cylinder housing substantially closed, the threshing bars acting as fan vanes, a considerable current of air is induced along the normal path of flow of material passing through the threshing mechanism, and this induced draft assists in forcing the straw and threshed grain from the housing of the threshing cylinder toward and through the discharge passage 63 therefrom to the separator housing 15, keeping the cylinder clear.

The straw and grain deposited upon the forward end of the shaking rack is, through the normal shaking action of the rack, advanced rearwardly along the rack, that is, in the direction of discharge from the separator housing, the grain, along with relatively short pieces of straw falling through the spaces between the slats of the rack as the straw is advanced. The straw continues to advance over the rack and to the discharge end thereof, and it is forced over the discharge end directly into the field or is conveyed through a suitable rigid or flexible conveyer to a desired point of discharge, such discharge being assisted by the air discharging through the separator housing.

During operation of the separating mechanism, threshed grain and some chaff dropping through the apertures in the rack, fall onto the grain pan, the major portion of which is formed by the bottom plate 71 of the separator housing. A grain drag or rake 72 of conventional design is provided within the separator housing below the straw rack; and the material falling through the straw rack is carried along the bottom of the grain pan to a suitable point of discharge therefrom to a cleaning device 74. This cleaning device may be disposed in a housing extension depending from the separator housing, and the cleaning device may be of conventional form including a plurality of superposed and inclined screens 75 with means for imparting a vibrating motion thereto, to permit the cleaned grain to pass through the screens and unthreshed heads to move toward and across the rear edges of the screens, ventilating means, of conventional form, being provided to facilitate the cleaning operation, particularly by way of carrying away small particles of dirt and dust.

Threshed and cleaned grain passing through the cleaning device is carried by a conveyer 76 and a suitable elevator, not shown, associated therewith to the grain bin. The tailings or larger particles of straw and unthreshed grain heads rejected by the cleaning screens drop into the casing of a conveyer 78 and are carried thereby to an elevator 79 extending toward the threshing cylinder and with its discharge end or spout above the cylinder.

The tailings drop from the discharge end or spout of the elevator 79 to a trough like housing or conveyer 81 having a downward inclination toward the left hand side of the machine as viewed in Fig. 1, to facilitate movement in that direction, whence they discharge, through a spout 82 to a chute 90 opening into the forward side of the threshing cylinder housing, where this discharged material may be subjected to a further threshing operation. Preferably, this conveyer 81 extends to the end of the cylinder housing opposite the forward end of the separator housing and the tailings are preferably discharged to the cylinder housing adjacent this end, so as to permit such tailings, after the threshing action thereon, to be subjected to a separating action throughout the full length of the separator. And this conveyer 81 is preferably provided with a screen 83 extending the full length of the housing and onto which the tailings are discharged from the elevator 79. As the tailings pass along the screen to the discharge end of the conveyer, the conveyer acts as a recleaner, particles of clean grain dropping through the screen; and these latter may be carried by a separate discharge spout 84 to a chute 85 leading to the grain pan of the separator.

The cleaning action as the material passes over the screen 83 may be supplemented by imparting a shaking or vibrating motion to the housing of the conveyer 81, by mounting the housing on a pivoted link support and connecting the linkage or the housing to a shaking device, such as a shaker arm 68.

The grain bin 16 is mounted on the frame structure and the support 10 in a position at the side of the housing for the threshing mechanism and in front, in the direction of travel of the machine, of the discharge end of the separator housing. The bin is of such design and so located that its weight and the weight of material contained therein is balanced about the axes of the supporting traction wheels.

Power for operating the various mechanisms of the apparatus is derived from a main power shaft made up of longitudinally adjustable sections 85, 86. The forward section 85 is provided with a spherical journal portion 87 rotatably supported in a spherical bearing 89 which is pivotally mounted on the forward end of the drawbar frame 12 to move in a plane extending in the general direction of the axis of the shaft section 85. The shaft section 85 is connected through a double universal connection, comprising universal joints 90 and 91 and an intermediate shaft coupling 92, to the rear end of a power shaft 93 carried by a tractor, not shown, this power shaft preferably being operable at speeds independent of the speed of travel of the tractor.

The connection between the shaft sections 85 and 86 is preferably in the form of a combined slip clutch and telescopic connection, of known form, the section 85 being preferably connected to the coupling sleeve through a slip clutch adjusted to permit the section 85 to rotate independently of the coupling sleeve when the load on the harvester-thresher is above a predetermined value; and the connection between the section 86 and the coupling sleeve is preferably one which assures that the section 86 rotates with the coupling sleeve at all times but also permits relative sliding movement between the section 86 and the coupling sleeve.

With this arrangement of the main power shaft, it is free to accommodate itself, through the telescopic coupling between its sections, and the pivoted spherical bearing 89 of the shaft section 85, and the several universal couplings, to all relative displacements of the power shaft 93 of the tractor, as the latter moves over uneven ground and makes turning movements of any degree.

A power shaft 95 mounted in a bearing housing 96 supported on the structure of the bin 16 or the supporting frame, is connected through a set of bevel gears, indicated at 97, to a driving shaft 98; and the shaft 95 is connected through drive pulleys thereon and suitable cooperative belts and pulleys to the rotating cylinder of the threshing mechanism and also to the power operated rollers of the feeding drapers, and likewise to the mechanism for operating the sickle device, to impart the desired movement to these operating parts.

The conveyer 76 is preferably operated by the shaft 98; and power for operating the eccentric 70 which produces the shaking motion of the rack, and for vibrating the cleaning device 74 and for actuating the conveyer 78 and the recleaning conveyer 81 and the elevator 79 is preferably derived from the shaft 98.

The reel shaft is preferably driven through a driven pulley thereon and a power connection thereto from one of the traction wheels of the apparatus. This arrangement insures a proper speed of the gathering reel independently of the speed at which the apparatus travels over the ground, or the speeds of operation of the sickle and threshing and separating mechanisms.

With the arrangement described, as to the threshing cylinder being of substantially the same length as the sickle, and the feeding of the cut grain to the cylinder over an extended length in a relatively thin stream or band, the threshing cylinder may operate at high speeds without choking, thereby improving the threshing action and increasing the capacity of the machine; and as the grain stalks are presented to the cylinder longitudinally, i. e., in the direction in which they fall on the feeding draper, without any turns in its path from the sickle, the stalks pass through the threshing mechanism without packing or bunching, and there is relatively little breakage of straw, a feature which improves the separating and cleaning action. With the separator housing arranged transversely of the direction of travel of the grain from the sickle and through the threshing mechanism, and disposed in the rear of the latter and the grain bin, a machine with very small fore and aft dimensions, and with suitable provision for up and down adjustment of the header frame and sickle, is possible; and the expense of providing a complete machine, with the weight thereof balanced about the two traction wheels, is greatly reduced. And with the discharge from the separator housing at the side, rather than the rear, of the machine, the straw is deposited on the ground at points where it will not be crushed by the wheels during its next succeeding travel along the field.

While the operation of the machine has been described more particularly in connection with harvesting of grain, it should be understood that the machine is also capable of successful use in the harvesting of a variety of other crops.

It should be understood that features and operating effects of the invention disclosed hereinabove have definite commercial applications and utility other than in the particular apparatus described herein; and it is not desired that the invention be limited to the exact details of construction shown and described herein for obvious modifications within the scope of the invention may occur to persons skilled in the art.

It is claimed and desired to secure by Letters Patent:

1. A harvester-thresher, comprising harvesting mechanism, threshing mechanism, separating mechanism, and means for conveying substantially all of the material severed by said harvesting mechanism in a straight line therefrom to said threshing mechanism, said separating mechanism being disposed in the rear of said threshing mechanism and extending transversely of the line of travel of said threshing mechanism and adapted to advance and discharge threshed stalks in a sidewise direction with respect to the normal direction of travel of the harvester-thresher.

2. A harvester-thresher, comprising harvesting mechanism comprising a cutting sickle, threshing mechanism comprising a rotatable threshing cylinder and a stationary threshing member associated therewith, said threshing cylinder being of substantially the same length as said sickle, conveying means of a width equal to the length of said sickle and said threshing cylinder and adapted to convey a band of material of the full width of said sickle and present said material to the threshing mechanism over the full length of said threshing cylinder, and separating mechanism comprising a housing in the rear of and communicating with the discharge from said threshing mechanism, and a separating device in said housing extending and adapted to advance material discharged from said threshing mechanism in a direction at substantially right angles to the direction of discharge of the material through said threshing mechanism.

3. A harvester-thresher, comprising harvesting mechanism including a cutting sickle, threshing mechanism including a rotating threshing cylinder, said harvesting mechanism being arranged for up and down movement relative to threshing mechanism, and separating mechanism, said threshing cylinder being of substantially the same length as said sickle and disposed directly in the rear of said sickle with its axis parallel thereto, said separating mechanism being disposed at the rear of said threshing mechanism and extending longitudinally of the axis of said threshing cylinder and open to communication with said threshing mechanism and being adapted to receive material discharged from said threshing mechanism and to advance said material in a direction transverse to the direction of discharge of said material from said threshing mechanism.

4. A harvester-thresher, comprising harvesting mechanism including a cutting sickle, threshing mechanism including a rotating threshing cylinder, and separating mechanism, said threshing cylinder being of substantially the same length as said sickle and disposed directly in the rear of said sickle with its axis parallel thereto, means for conveying material severed by said sickle to said threshing mechanism along a path of a width substantially equal to the length of said sickle and said threshing cylinder, said separating mechanism being disposed at the rear of said threshing means and extending longitudinally of the axis of said threshing cylinder and being adapted to receive material discharged from said threshing mechanism and to advance said material in a direction transverse to the direction of discharge of said material from said threshing mechanism.

5. A harvester-thresher, comprising harvesting mechanism including a cutting sickle, threshing mechanism including a rotating threshing cylinder, and separating mechanism, said threshing cylinder being of substantially the same length as said sickle and disposed directly in the rear of said sickle with its axis parallel to said sickle, means for conveying material severed by said sickle directly to said threshing mechanism, said means comprising a flexible traveling conveyer of substantially the same width as the length of said sickle and said threshing cylinder and having its forward edge disposed adjacent said sickle and its rear edge adjacent said threshing mechanism, said separating mechanism being disposed at the rear of said threshing means and extending longitudinally of the axis of said threshing cylinder and being adapted to receive material discharged from said threshing mechanism and to advance and discharge said material in a direction transverse to the direction of travel of the harvester-thresher.

6. A harvester-thresher, comprising a wheeled support, harvesting mechanism comprising a cutting sickle, threshing mechanism located in line with and to the rear of said sickle, a grain bin located at the side of said threshing mechanism, and separating mechanism communicating with the discharge from said threshing mechanism and extending and adapted to advance material discharged from said threshing mechanism transversely of the direction of travel of the harvester-thresher and located to the rear of said threshing mechanism and said grain bin.

7. A harvester-thresher, comprising a wheeled support, harvesting mechanism comprising a cutting sickle, threshing mechanism of substantially the same length as said cutting sickle and located in line with and to the rear of said sickle, a grain bin located at the side of said threshing mechanism, and separating mechanism communicating with the discharge from said threshing mechanism and extending and adapted to advance material discharged from said threshing mechanism transversely of the direction of travel of the harvester-thresher and located to the rear of said threshing mechanism and said grain bin, the weight of the harvester-thresher being substantially balanced about said wheeled support.

8. A harvester-thresher, comprising a two-wheeled support, harvesting mechanism comprising a cutting sickle, threshing mechanism located directly in the rear of said sickle, a grain bin located at the side of said threshing mechanism, and separating mechanism communicating with the discharge from said threshing mechanism and located to the rear of said threshing mechanism and said grain bin and extending and adapted to advance material discharged from said threshing mechanism transversely of the direction of travel of the harvester-thresher, the weight of the harvester-thresher being substantially balanced about said wheeled support.

9. A harvester-thresher, comprising a support comprising a pair of laterally spaced traction wheels, harvesting mechanism comprising a cutting sickle, threshing mechanism located in line with and directly to the rear of said sickle, a grain bin located at the side of said threshing mechanism, and separating mechanism communicating with the discharge from said threshing mechanism and extending and adapted to advance material discharged from said threshing mechanism transversely of the direction of travel of the harvester-thresher and located to the rear of said threshing mechanism and said grain bin, the weight of the harvester-thresher and grain bin and the contents thereof being substantially balanced about the axis of said traction wheels.

10. A harvester-thresher, comprising a two-wheeled support, harvesting mechanism comprising a cutting sickle, threshing mechanism comprising a threshing cylinder located directly in the rear of said sickle, flexible conveying means between said sickle and said threshing mechanism and of a width substantially equal to the length of said sickle and said threshing mechanism, a grain bin located at the side of said threshing mechanism, and disposed with the effective weight thereof and of its contents balanced about the common axis of said wheels, and separating mechanism communicating with the discharge from said threshing mechanism and extending and adapted to advance material discharged from said threshing mechanism transversely of the direction of travel of the harvester-thresher and located to the rear of said threshing mechanism and said grain bin, the weight of the harvester-thresher being substantially balanced about the common axis of said wheels.

11. A harvester-thresher, comprising a support including a pair of traction wheels, harvesting mechanism comprising a cutting sickle, threshing mechanism of substantially the same length as said cutting sickle and located in line with and to the rear of said sickle, a grain bin located at the side of said threshing mechanism, and separating mechanism communicating with the discharge from said threshing mechanism and extending and adapted to advance material discharged from said threshing mechanism transversely of the direction of travel of the harvester-thresher and located directly in the rear of said threshing mechanism and said grain bin, and forwardly extending draft means for connection to a source of power for pulling the harvester-thresher, the weight of the harvester-thresher being substantially balanced about said traction wheels.

12. A harvester-thresher, comprising a two-wheeled support, harvesting mechanism comprising a cutting sickle, threshing mechanism located in line with and to the rear of said sickle, a grain bin located at the side of said threshing mechanism, and separating mechanism communicating with the discharge from said threshing mechanism and extending and adapted to advance material discharged from said threshing mechanism transversely of the direction of travel of the harvester-thresher and located to the rear of said threshing mechanism and said grain bin, a forwardly extending power shaft, and draft means located at the same side of said threshing mechanism as said grain bin for connection to a source of power for pulling the harvester-thresher and for driving said power shaft, the weight of the harvester-thresher being substantially balanced about said wheeled support.

13. A harvester-thresher, comprising a supporting frame structure, a pair of traction wheels carrying the weight of said frame structure and parts mounted thereon, threshing mechanism including a housing and a rotatable threshing cylinder therein, separating mechanism including a housing and a straw shaking device therein extending substantially the full length of said housing, a header frame pivotally mounted with respect to said frame and the housing for said threshing cylinder, a cutting sickle at the forward end of said header frame, said sickle and said threshing cylinder being of substantially the same length, means carried by said header frame for conveying a stream of severed material from said sickle to said threshing cylinder and presenting said material to said cylinder across the full length thereof, said frame structure including a forwardly extending portion serving as a draft means for applying pulling power to the harvester-thresher, the housing of said separating mechanism communicating with the discharge from the housing of said threshing mechanism throughout substantially the full length of said threshing cylinder, and said latter housing and said straw shaking device therein extending longitudinally of the axis of the threshing cylinder and disposed in the rear of said threshing cylinder, the weight of said threshing mechanism and said header frame, said separating mechanism and said forwardly extending frame portion being substantially balanced about the axes of said wheels.

14. A harvester-thresher, comprising a supporting frame structure, a pair of traction wheels carrying the weight of said frame structure and parts mounted thereon, threshing mechanism including a housing and a rotatable threshing cylinder therein, separating mechanism including a housing and a straw shaking device therein, a header frame pivotally mounted with respect to said frame and the housing for said threshing cylinder, a cutting sickle at the forward end of said header frame, said sickle and said threshing cylinder being of substantially the same length, means carried by said header frame for conveying a stream of severed material from said sickle to said threshing cylinder and presenting said material to said cylinder across the full length thereof, a grain bin located with its center of gravity substantially in vertical alinement with the axes of said traction wheels, said frame structure including a forwardly extending portion laterally spaced from said header frame and serving as a draft means for applying pulling power to the harvester-thresher, the housing of said separating mechanism communicating with the discharge from the housing of said threshing mechanism throughout substantially the full length of said threshing cylinder, and said latter housing and said straw shaking device therein extending longitudinally of the axis of the threshing cylinder and disposed in the rear of said threshing cylinder and said grain bin, said threshing mechanism and said header frame, said separating mechanism and said grain bin being carried by said frame structure, and the weight of said frame structure and said parts carried thereby being substantially balanced about the axes of said wheels.

15. A harvester-thresher, comprising a separating frame structure, a pair of traction wheels carrying the weight of said frame structure and parts mounted thereon, threshing mechanism including a housing and a rotatable threshing cylinder therein, separating mechanism including a housing and a straw shaking device therein extending substantially the full length of said housing, a header frame pivotally mounted with respect to said frame and the housing for said threshing cylinder, a cutting sickle at the forward end of said header frame, said sickle and said threshing cylinder being of substantially the same length, means carried by said header frame for conveying a stream of severed material from said sickle to said threshing cylinder and presenting said material to said cylinder across the full length thereof, a grain bin located with the center of gravity of itself and normal contents thereof substantially in vertical alinement with the axes of said traction wheels, said frame structure including a forwardly extending portion laterally spaced from said header frame and serving as a draft means for applying pulling power to the harvester-thresher, a forwardly extending power shaft carried by said latter portion of said frame structure and serving to apply power for operating the mechanisms of the harvester-thresher, the housing of said separating mechanism communicating with the discharge from the housing of said threshing mechanism throughout substantially the full length of said threshing cylinder, and said latter housing and said straw shaking device therein extending longitudinally of the axis of the threshing cylinder and disposed directly in the rear of said threshing cylinder and said grain bin, said threshing mechanism and said header frame, said separating mechanism and said grain bin being carried by said frame structure, and the weight of said frame structure and parts carried thereby being substantially balanced about the axes of said wheels.

16. A harvester-thresher, comprising a cutting sickle, threshing mechanism of substantially the same width as said cutting sickle, means for conveying severed stalks from said sickle upwardly and rearwardly to said threshing mechanism in a direct line from said cutting sickle, and separating mechanism disposed in the rear of and extending laterally past said threshing mechanism and adapted to receive stalks and threshed material from said threshing mechanism, said separating mechanism including devices for agitating said stalks and advancing the same along and discharging said stalks from said separating mechanism in a direction transverse to the direction of travel of said harvester-thresher.

17. A harvester-thresher, comprising a cutting sickle, threshing mechanism of substantially the same width as said cutting sickle and including a rotating threshing cylinder with its axis of rotation extending transverse to the direction of travel of said harvester-thresher, an endless traveling belt for conveying severed stalks from said sickle upwardly and rearwardly to said threshing mechanism in a direct line in the direction in which said stalks drop from said cutting sickle, and separating mechanism disposed in the rear of and extending laterally past said threshing mechanism and adapted to receive stalks and threshed material from said threshing mechanism, said separating mechanism including devices for agitating said stalks and advancing the same along and discharging said stalks from said separating mechanism in a direction transverse to the direction of travel of said harvester-thresher.

18. A harvester-thresher, comprising a cutting sickle, threshing mechanism, means for conveying substantially all of the severed stalks rearwardly and upwardly from said sickle in a direct line to said threshing mechanism, said threshing mechanism being adapted to pass the stalks therethrough and discharge the stalks therefrom in the direction in which they are received from said conveying means, and separating mechanism in the rear of and extending laterally past and adapted to receive stalks from said threshing mechanism, said separating mechanism including devices for agitating said stalks and advancing the same along and discharging said stalks from said separating mechanism in a direction transverse to the direction of passage of said stalks through said threshing mechanism.

19. A harvester-thresher, comprising a cutting sickle, a rotatable reel associated with said sickle, threshing mechanism directly in the rear of and of substantially the same width as said cutting sickle, means for conveying severed material from the said sickle in an upwardly inclined direct line to said threshing mechanism in the direction in which said material drops from said cutting sickle, and separating mechanism disposed in the rear of and extending laterally past said threshing mechanism and adapted to receive material from said threshing mechanism, said separating mechanism including devices for agitating said material and advancing the same along and discharging said material from said separating mechanism in a direction transverse to the direction of travel of said harvester-thresher.

20. A harvester-thresher, including a support comprising a pair of laterally spaced wheels, harvesting mechanism comprising a cutting sickle, threshing mechanism located in line with and directly to the rear of said sickle, and separating mechanism communicating with the discharge from said threshing mechanism and extending and adapted to advance material discharged from said threshing mechanism transversely of the direction of travel of the harvester-thresher, the weight of the harvester-thresher being substantially balanced about the common axis of said wheels.

21. A harvester-thresher, comprising harvesting mechanism including a cutting sickle, threshing mechanism of substantially the same width as said cutting sickle located to the rear thereof and in direct line therewith, a housing within which said threshing mechanism is located, said housing being provided at its forward side with a feed opening to said threshing mechanism, means for conveying material severed by said cutting sickle directly therefrom to said threshing mechanism, separating mechanism extending laterally past and disposed in the rear of said threshing mechanism in position to receive directly from said threshing mechanism material discharged therefrom and adapted to advance said material transversely of the direction of travel of said harvester-thresher, and a storage bin for separated material disposed laterally of said threshing mechanism and forwardly of said separating mechanism.

22. A harvester-thresher, comprising harvesting mechanism including a cutting sickle, threshing mechanism of substantially the same width as and located to the rear of said cutting sickle, a housing within which said threshing mechanism is located, said housing provided at its forward side with a feed opening to said threshing mechanism, means for conveying material severed by said cutting sickle directly rearwardly therefrom to said threshing mechanism, a support for said cutting sickle and said conveying means providing for relative up and down movement thereof with respect to said threshing mechanism, and separating mechanism extending laterally of and disposed in the rear of said threshing mechanism in position to receive from said threshing mechanism material discharged therefrom and adapted to advance said material transversely of the direction of travel of said harvester-thresher.

23. A harvester-thresher, comprising harvesting mechanism including a cutting sickle, threshing mechanism of substantially the same width as said cutting sickle located to the rear of said cutting sickle, a housing within which said threshing mechanism is located, said housing provided at its forward side with a feed opening to said threshing mechanism, means for conveying material severed by said cutting sickle directly therefrom to said threshing mechanism in a direction opposite to the direction of travel of said harvester-thresher, a support for said cutting sickle and said conveying means mounted for relative up and down movement with respect to said threshing mechanism, a separating mechanism extending laterally of and disposed in the rear of said threshing mechanism in position to receive therefrom directly material as it is discharged from said threshing mechanism, and a housing for said separating mechanism, said separating mechanism including means disposed within said housing for advancing in a direction transverse to the direction of travel of said harvester-thresher material received from said threshing mechanism.

24. A harvester-thresher, comprising a supporting structure carrying a grain cutting mechanism, a threshing mechanism including a rotary threshing element disposed directly to the rear of and with its axis of rotation substantially parallel to said cutting mechanism, said threshing mechanism being of substantially the same width as said cutting sickle, means for conveying material severed by said cutting sickle in a direct path from said cutting mechanism to said threshing mechanism, and a separating mechanism located to the rear of said threshing mechanism and extending laterally past said threshing mechanism, one end portion of said separating mechanism being in position to receive directly from said threshing mechanism material discharged therefrom, and said separating mechanism including means for advancing said material past said threshing mechanism and toward the other end of said separating mechanism.

25. A harvester-thresher, comprising a supporting structure provided with a pair of laterally spaced supporting wheels and carrying harvesting mechanism including a cutting sickle, threshing mechanism including a rotatable threshing element of substantially the same width as said cutting sickle and disposed in the rear of and in line with said cutting sickle, means for conveying material severed by said cutting sickle directly therefrom to said threshing mechanism in a direction opposite to the direction of travel of said harvester-thresher, and separating mechanism extending longitudinally of the axis of and laterally past said rotatable threshing element and communicating with the discharge from said threshing mechanism and adapted to advance material discharged from said threshing mechanism in a direction transverse to the direction of travel of said harvester-thresher, the weight of said supporting structure and said harvesting mechanism, conveying means, threshing mechanism and separating mechanism being substantially balanced as a unit about the common axis of said supporting wheels.

26. A harvester-thresher, comprising a supporting structure provided with a pair of laterally spaced supporting wheels and carrying harvesting mechanism including a cutting sickle, threshing mechanism including a rotatable threshing element of substantially the same width as said cutting sickle and disposed in the rear of and in line with said cutting sickle, means for conveying material severed by said cutting sickle directly therefrom to said threshing mechanism in a direction opposite to the direction of travel of said harvester-thresher, separating mechanism extending longitudinally of the axis of said rotatable threshing element and communicating with the discharge from said threshing mechanism and adapted to advance material discharged from said threshing mechanism in a direction transverse to the direction of travel of said harvester-thresher, the weight of said supporting structure and said harvesting mechanism, conveying means, threshing mechanism and separating mechanism being substantially balanced as a unit about the common axis of said supporting wheels, and a storage bin for threshed grain or the like mounted on said supporting structure in substantially balanced relation about said common axis.

WALTER G. CHARLEY.